(12) United States Patent
Cooley et al.

(10) Patent No.: US 8,180,761 B1
(45) Date of Patent: May 15, 2012

(54) REFERRER CONTEXT AWARE TARGET QUEUE PRIORITIZATION

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 576 days.

(21) Appl. No.: 11/965,526

(22) Filed: Dec. 27, 2007

(51) Int. Cl.
*G06F 17/00* (2006.01)

(52) U.S. Cl. .......................................... 707/709; 726/24
(58) Field of Classification Search ........................ None
See application file for complete search history.

(56) References Cited

U.S. PATENT DOCUMENTS

| | | | |
|---|---|---|---|
| 6,418,433 B1 * | 7/2002 | Chakrabarti et al. ................... | 1/1 |
| 6,725,214 B2 * | 4/2004 | Garcia-Chiesa ...................... | 1/1 |
| 6,751,612 B1 * | 6/2004 | Schuetze et al. .............. | 707/709 |
| 7,028,039 B2 * | 4/2006 | Burrows et al. ............... | 707/709 |
| 7,383,282 B2 * | 6/2008 | Whitehead et al. ........... | 707/700 |
| 7,447,678 B2 * | 11/2008 | Taylor et al. ........................... | 1/1 |
| 7,496,962 B2 | 2/2009 | Roelker et al. | |
| 7,516,184 B2 * | 4/2009 | Thomas ........................ | 709/206 |
| 7,584,194 B2 * | 9/2009 | Tuttle et al. ............................ | 1/1 |
| 7,640,590 B1 * | 12/2009 | McCorkendale et al. ...... | 726/25 |
| 7,672,943 B2 * | 3/2010 | Wong et al. ................... | 707/709 |
| 7,739,253 B1 * | 6/2010 | Yanovsky et al. ............. | 707/705 |
| 7,747,603 B2 * | 6/2010 | Apparao et al. ............... | 707/709 |
| 7,769,740 B2 * | 8/2010 | Martinez et al. .............. | 707/706 |
| 7,966,337 B2 * | 6/2011 | Blackman et al. ............ | 707/752 |
| 7,979,417 B1 * | 7/2011 | Bharat et al. .................. | 707/709 |
| 8,020,206 B2 * | 9/2011 | Hubbard et al. ................ | 726/22 |
| 2002/0059221 A1 * | 5/2002 | Whitehead et al. ................ | 707/5 |
| 2002/0099723 A1 * | 7/2002 | Garcia-Chiesa .............. | 707/200 |
| 2002/0138509 A1 * | 9/2002 | Burrows et al. ............. | 707/501.1 |
| 2003/0097591 A1 * | 5/2003 | Pham et al. ..................... | 713/201 |
| 2004/0088570 A1 * | 5/2004 | Roberts et al. ................. | 713/201 |
| 2004/0093513 A1 | 5/2004 | Cantrell et al. | |
| 2004/0148281 A1 * | 7/2004 | Bates et al. ........................ | 707/3 |
| 2006/0031359 A1 * | 2/2006 | Clegg et al. ................... | 709/206 |
| 2006/0230011 A1 * | 10/2006 | Tuttle et al. ..................... | 706/62 |
| 2006/0253584 A1 * | 11/2006 | Dixon et al. .................. | 709/225 |
| 2007/0006308 A1 | 1/2007 | Desouza et al. | |
| 2007/0258437 A1 | 11/2007 | Bennett | |
| 2008/0010683 A1 * | 1/2008 | Baddour et al. ................ | 726/24 |

(Continued)

OTHER PUBLICATIONS

Burnett, M., "Forensic Log Parsing with Microsoft's LogParser," SecurityFocus, Jul. 18, 2003, [online] [Retrieved on Apr. 9, 2008] Retrieved from the Internet<URL:http://www.securityfocus.com/infocus/1712>.

(Continued)

*Primary Examiner* — Hung Q Pham
*Assistant Examiner* — Hubert Cheung
(74) *Attorney, Agent, or Firm* — Fenwick & West LLP

(57) ABSTRACT

A computer, computer program product, and method prioritize a web crawler target link queue using referrer context information associated with a remote object link. An access statistics collection module detects links to remote objects and retrieves referrer context information for the links. An access statistics back end module receives and stores the referrer context information from the access statistics collection module. The referrer context information is analyzed by a target list prioritization module that uses the results of the analysis to prioritize a target queue of a web crawler. The referrer context information is an important resource in identifying information about how a link spreads, e.g., for threat detection or identification of popular links for indexing to produce more relevant search results.

17 Claims, 5 Drawing Sheets

U.S. PATENT DOCUMENTS

| | | | |
|---|---|---|---|
| 2008/0189263 A1* | 8/2008 | Nagle | 707/5 |
| 2008/0256065 A1* | 10/2008 | Baxter | 707/5 |
| 2008/0282080 A1 | 11/2008 | Hyndman et al. | |
| 2009/0006371 A1* | 1/2009 | Denoue et al. | 707/5 |
| 2009/0113547 A1 | 4/2009 | Higashikado | |
| 2009/0132524 A1* | 5/2009 | Stouffer et al. | 707/5 |
| 2009/0216758 A1* | 8/2009 | Tuttle et al. | 707/5 |
| 2009/0299880 A1* | 12/2009 | Stoppelman | 705/27 |
| 2010/0076954 A1* | 3/2010 | Dulitz et al. | 707/709 |
| 2010/0268701 A1* | 10/2010 | Zhang et al. | 707/709 |
| 2010/0293116 A1* | 11/2010 | Feng et al. | 706/12 |
| 2011/0030058 A1* | 2/2011 | Ben-Itzhak et al. | 726/24 |
| 2011/0087648 A1* | 4/2011 | Wang et al. | 707/709 |
| 2011/0252478 A1* | 10/2011 | Hubbard et al. | 726/24 |

OTHER PUBLICATIONS

United States Office Action, U.S. Appl. No. 11/961,495, May 5, 2011, 12 pages.

United States Office Action, U.S. Appl. No. 11/961,495, Nov. 23, 2010, 11 pages.

* cited by examiner

REFERRER CONTEXT AWARE TARGET QUEUE PRIORITIZATION

BACKGROUND OF THE INVENTION

1. Field of the Invention

This invention pertains in general to a web crawling selection policy and in particular to prioritization of web crawler queues based on referrer context information for a remote object link received via a network.

2. Description of the Related Art

Conventional web crawlers have very little useful information by which they can prioritize their target link queues for inspecting links, e.g., for a search engine. Web crawlers typically rely on either first in first out (FIFO) selection policies or prioritize their target link queues by inbound link popularity, i.e., the count of other sites and or objects that point to the given link. However, using these methods, web crawlers take a long time to get through the queue, putting them significantly behind human-based or self-spreading link distribution channels due to delays in re-indexing or investigating links that potentially should be prioritized higher relative to other links in the queue.

There are several disadvantages to conventional FIFO or inbound link-count prioritization of target link queues, e.g. by web crawlers associated with search engines. For a web search engine, if a link is very popular but is not highly prioritized for investigation, e.g., because it recently came into the queue, then the link will remain unindexed despite receiving lots of traffic.

Many malicious attacks on computer systems are received as remote object links in network traffic, such as email, instant messaging, or HTTP traffic associated with a web site. In the context of a threat scanner search engine, if a link is malicious but fairly new, then the link will have time to attack many different users' computers before being identified by the threat scanner.

Traditional web crawler selection policies lack access to referrer context information about remote objects associated with links received in network traffic. Referrer context information allows the entity that provided (or received) a link to be ascertained, as well as the protocol in which it was received and other aspects of the transmission. Referrer context information can be an important resource in identifying how a link moves from one client to another.

BRIEF SUMMARY

The above and other needs are met by a computer, computer program product, and method for prioritizing a web crawler target link queue using referrer context information associated with a remote object link. Embodiments of the computer and computer program product comprise an access statistics collection module that detects links to remote objects and retrieves referrer context information for the links, an access statistics back end module that receives and stores the referrer context information from the access statistics collection module, and a target list prioritization module that analyzes the referrer context information and uses the results of the analysis to prioritize a target link queue of a web crawler.

The referrer context information is an important resource in identifying information about how a link spreads, e.g., for threat detection or identification of popular link for indexing to produce more relevant search results. If a link could be prioritized higher due to its popularity, then it would be indexed soon and a web search engine could provide better query results. And if a potentially malicious link could be prioritized higher because its referrer context information is indicative of a worm or virus, then the threat scanner could identify the link as malicious earlier and decrease the number of computers subject to attack. The referrer context information thus allows for a more complete picture of how a link moves from one client to another by tracking how the link was received and sent.

Embodiments of the method comprise detecting links to remote objects, retrieving and storing the referrer context information, analyzing the referrer context information, and prioritizing a target queue of a web crawler based upon the analysis.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
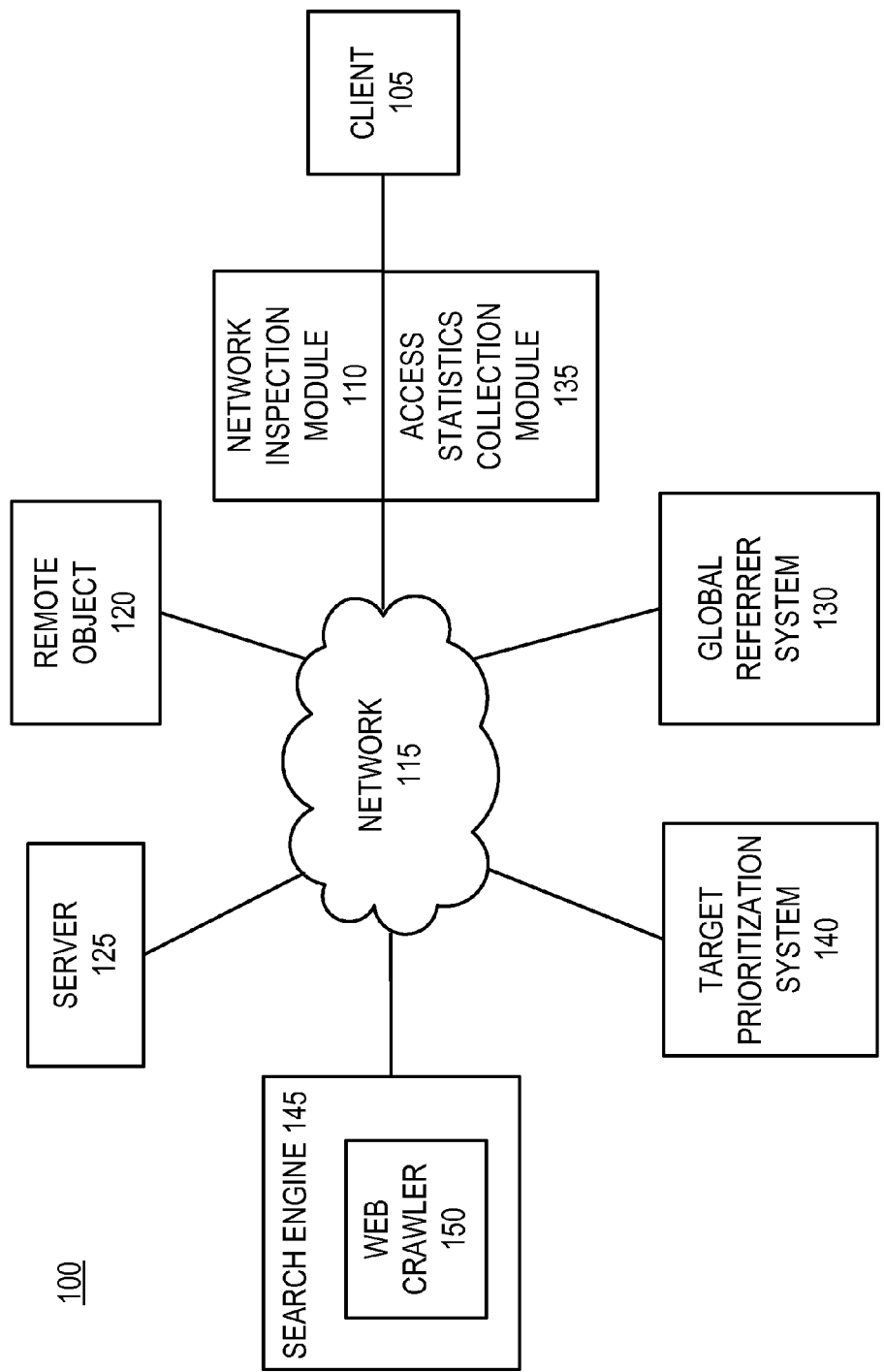
FIG. 1 is a high-level block diagram of a computing environment according to one embodiment.

FIG. 1 is a high-level block diagram of a computing environment 100 according to one embodiment. FIG. 1 illustrates a client 105 connected via a network inspection module 110 and/or an access statistics module 135, to a network 115 for, among other things, accessing a remote object 120 or a search engine 145. The client 105 also may communicate with a server 125, a global referral system 130, and a target prioritization system 140 via the network 115. Only one client 105, one remote object 120, and one server 125 are shown in FIG. 1 in order to simplify and clarify the description. Embodiments of the computing environment 100 can have thousands or millions of clients 105, remote objects 120, and servers 125 connected to the network 115.

In one embodiment, the client 105, or client device, is a computer used by one or more users to connect to the network 115 and various network entities, such as remote objects 120, servers 125, global referrer system 130, target prioritization system 140, and search engine 145. The client 105, for example, can be a personal computer or other network-capable device like a personal digital assistant (PDA), mobile telephone, pager, or television "set-top box." For purposes of this description, the term "client" also includes computers such as servers and gateways that have the characteristics described herein.

The client 105 executes one or more applications such as a web browser, email program, word processor, spreadsheet, image viewer, or music player. The application has an interface for executing content received via the network 115, stored on a local disk, or located elsewhere. In a common example, the application is a web browser such as MICROSOFT INTERNET EXPLORER or MOZILLA FIREFOX that includes functionality for downloading web pages, e.g., from a server 120 and executing scripts written in VBScript or JAVASCRIPT contained therein. Some content downloaded and/or accessed by an application contains malicious code that attempts to exploit a vulnerability in the application or otherwise attack the client 105.

A network inspection module 110 monitors network traffic to and from the client 105, for all ports or a subset thereof. The network inspection module 110 may be a network proxy, local or remote to the client 105, or may be a network appliance. Thus, according to one embodiment, the network inspection module 110 may be integrated with client 105. Alternatively, the network inspection module 110 may be implemented as multiple plug-ins to network applications, such as to a web browser, email client, news reader, RDF Site Summary (RSS) feed hander, IM client, and the like. The network inspection module 110 captures network traffic and hands it off to a global referrer system 130.

A global referrer system 130 detects links to remote objects 120 within network traffic received from the network inspection module 110 and identifies context information about the referrers of the links. For example, for a link received at (or sent by) a client 105 via email, the global referrer system 130 identifies the link in the incoming (outgoing) email and identifies and stores referrer context information for the received (sent) link.

Referrer context information, in a general sense, is information allowing the entity that provided—or received—the link to be ascertained. Referrer context information may include a direction associated with the network traffic (e.g., inbound or outbound), a protocol, the remote link itself, the referrer (sender) and recipient (receiver), transmission associated data (server, etc.), time of transmission, time of receipt, transmission context, and the like. The content of the referrer context information is specific to the particular protocol in which the link was sent or received. In addition, when the referrer context information is associated with transmission, it also may have one or more attributes associated with the referrer context information, e.g., in the context of instant messaging, an attribute indicating the percentage of buddies to which a link was sent.

For example, for a link sent or received via Instant Messaging (IM) or Internet Relay Chat (IRC), the referrer context information includes a server and a user name; for Network News Transfer Protocol (NNTP), the referrer context information includes a server, a newsgroup, a posted, and a poster; for email, the referrer context information includes an email address (i.e., an email name and email domain in the form of emailname@emaildomain) and for a link sent or received via HTTP, the referrer context information includes a URL.

When referrer information associated with a link is request by the client 105 or a third party, the global referrer system 130 allows for a look up of the stored referrer context information. For example, an access statistics collection module 135 retrieves referrer context information from the global referrer system 130.

An access statistics collection module 135 detects client 105 access to links to remote objects. The access statistics collection module 135 is a local, remote, or transparent proxy according to one embodiment. When a link to a remote object is accessed, the access statistics collection module 135 calls into the global referrer system 130 to collect referrer context information corresponding to the link. Once obtained, the referrer context information is transmitted to a target prioritization system 140, along with the associated link.

The target prioritization system 140 is a client of the global referrer system 140 according to one embodiment. The target prioritization system 140 stores the referrer context information and associated link, analyzes this data for one or more clients 105, and uses the results of the analysis to prioritize a target queue of a web crawler 150. The target prioritization system 140 analysis is based on the referrer context information for the link with respect to one or more clients 105, i.e., how the link spread, and the number of clients 105 that visited the link. In addition, the target prioritization system 140 can be cross-referenced with suspicious content, file names, and/or binary signatures identified by other means, e.g., antimalware software products, to further tune the prioritization of the web crawler link queue. The target prioritization system 140 also may store the prioritization information.

Search engine 145 is an information retrieval system designed to help find information on a computer network, as known in the art. Search engine 145 is a threat scanner search engine according to one embodiment. Because it employs higher security than typical clients 105, the search engine 145 can delegate inspection of links to remote objects to a web crawler 150 associated with the search engine 145, to identify threats to prevent clients 105 from falling subject to the threats. According to another embodiment, search engine 145 is a standard Web search engine, which searches for information on the World Wide Web, such as web pages, images, and other types of files. The search engine 145 follows HTTP links, and puts these "target" links in a queue, e.g., in conjunction with a web crawler 150, for later inspection.

The web crawler 150, also known as a web spider or web robot, is a program or automated script which browses the World Wide Web in a methodical, automated manner. The search engine 145 uses web crawling as a means of providing up-to-date data, e.g., by creating a copy of all the visited pages for later processing by the search engine 145 that will index the downloaded pages to provide fast searches. The web crawler 150 starts with a target list of links to remote objects to visit. As the links are visited, the web crawler 150 identifies all the links on the associated page(s) and adds them to the target list of links to visit, which recursively are visited according to a set of policies. The web crawler 150 has a target link queue that is prioritized by the target prioritization system 140 using referrer context information retrieved from the global referrer system 130. The search engine 145 can thereafter visit the links according to their priority, e.g., to index them or to investigate a potential threat.

The network 115 represents the communication pathways between the client 105 and various network entities such as remote objects 120, servers 125, global referrer system 130, target prioritization system 140, and search engine 145. In one embodiment, the network 115 is the Internet. The network 115 can also utilize dedicated or private communications links that are not necessarily part of the Internet. In one embodiment, the network 115 uses standard communications technologies and/or protocols such as Ethernet, 802.11, etc. Similarly, the networking protocols used on the network 115 can include the transmission control protocol/Internet protocol (TCP/IP), the hypertext transport protocol (HTTP), the simple mail transfer protocol (SMTP), the file transfer protocol (FTP), etc. The data exchanged over the network 115 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

A remote object 120 is content, e.g., web content, to which a link points, such as a webpage, a downloadable file, scripts written in interpreted languages such as VBScript and JAVA-SCRIPT, executable programs, images, music, multimedia content, and the like. In some instances, a remote object 120 may include malicious code posing a threat to the client 105. For example, the remote object 120 may be a seemingly-innocuous web page that includes a malicious script. The script, when executed by the client 105, attempts to compromise the client 105, e.g., by exploiting a vulnerability of the client 105 or its applications.

A server 125 provides content, including remote objects 120, to the client 105 via the network 115. In one embodiment, the server 125 is a web server that provides content such as HTML web pages. In other embodiments, the server 125 is a different type of server, such as a server dedicated to providing a specific type of content. In some instances, the server 125 may surreptitiously provide malicious code to the client 105, for example, as contained in a remote object 120 as discussed above.

Figure 2:
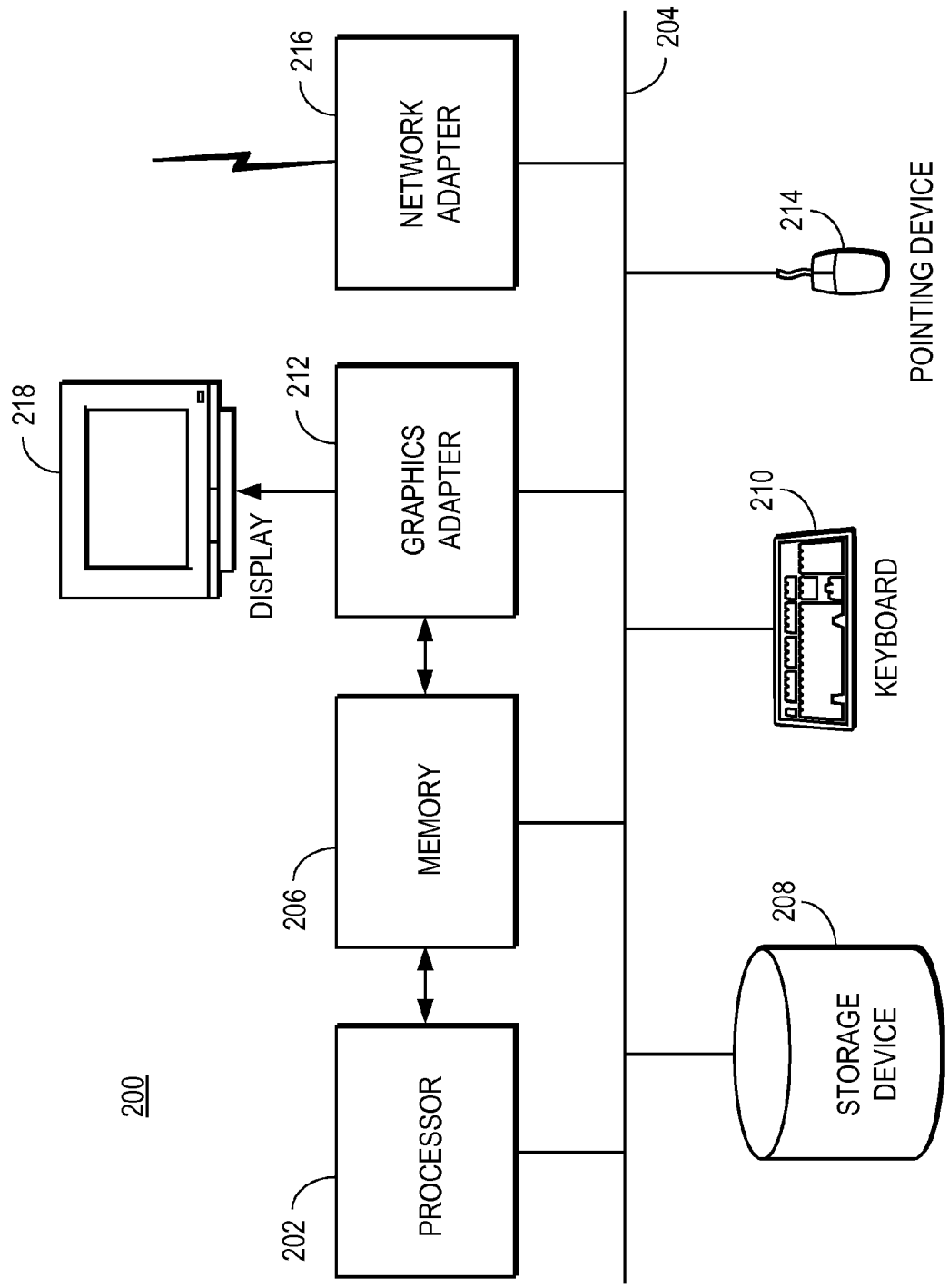
FIG. 2 is a high-level block diagram illustrating a typical computer for use as a client or server according to one embodiment.

FIG. 2 is a high-level block diagram illustrating a typical computer 200 for use as a client 105 or server 125, or for use as a network appliance or proxy such as network inspection module 110 or access statistics module 135. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The types of computers 200 utilized by the entities of FIG. 1 can vary depending upon the embodiment and the processing power utilized by the entity. For example, a client 105 that is a mobile device such as a PDA typically has limited processing power, a small display 218, and might lack a pointing device 214. The server 125, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. The application is formed of one or more files that typically reside on the storage device 208 and are loaded into memory 206 when executed. At least one of the files loaded into memory 206 is referred to as the "executable image" and is executed as a process. The computer 200 has a state that is defined by the content of the memory 208, values stored in registers of the processor 202, and/or other data within the computer at a given instant.

Figure 3:
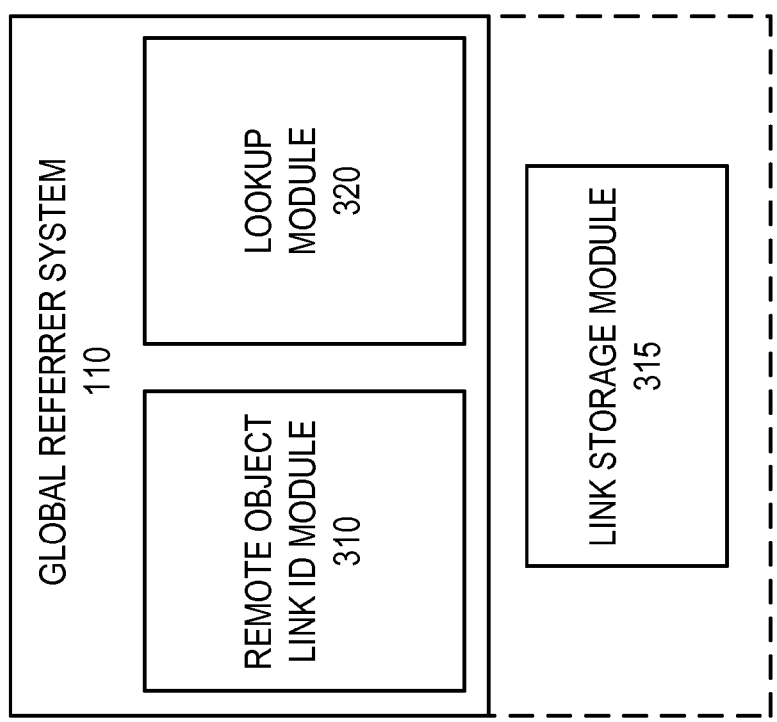
FIG. 3 is a block diagram illustrating a detailed view of a global referrer system according to one embodiment.

FIG. 3 is a block diagram illustrating a detailed view of a global referrer system 130 according to one embodiment. In some embodiments the global referrer system 130 is incorporated into an operating system executing on the client 105 while in other embodiments the global referrer system 130 may be a standalone application or part of another product according to various embodiments. As shown in FIG. 3, the global referrer system 130 itself includes multiple modules. Those of skill in the art will recognize that other embodiments of the global referrer system 130 can have different and/or other modules than the ones described here, and that the functionalities can be distributed among the modules in a different manner.

The global referrer system 130 includes a remote object link identification module 310, a link storage module 315, and a look up module 320 according to one embodiment.

A remote object link identification module 310 identifies remote links in network traffic, e.g., links to remote objects 120 received from the network inspection module 110. The remote links may be Uniform Resource Locators (URLs) for identifying remote objects 120 on the Internet or network 115 or Universal Naming Conventions (UNCs) for describing the location of a network resource, such as a shared file, directory, or printer. However, the remote links may be any string or binary data that represents a location of a remote object 120. The remote object link identification module 310 is configured to identify associated referrer context information for the remote links from a plurality of protocols. The protocols include, but are not limited to, standard and secure Hypertext Transfer Protocol (HTTP, HTTPs), Short Message Service (SMS), NNTP, Network Time Protocol (NTP), Simple Network Management Protocol (SNMP), Transmission Control Protocol (TCP), User Datagram Protocol (UDP), Internet Control Message Protocol (ICMP), Venturi Transport Protocol (VTP), Real-time Transport Protocol (RTP), Stream Control Transmission Protocol (SCTP), and Telnet.

The remote object link identification module 310 uses pattern matching to locate remote links in the network traffic. In one embodiment, the remote object link identification module 310 uses regular expression searching to identify remote links in the network traffic.

In addition to identifying the links themselves, the remote object link identification module 310 extracts referrer context information associated with the referrer that provided the remote link for an incoming link. The referrer context information is specific to the protocol that the remote link was found on. For example, for a link received via HTTP, the referrer context information includes a URL; for Instant Messaging (IM) or Internet Relay Chat (IRC), the referrer context information includes a server and a user name; and for Network News Transfer Protocol (NNTP), the referrer context information includes a server, a newsgroup, a post, and a poster. Thus, for some protocols, the referrer context information includes an identifier of the referrer, for example a user name for IM or IRC.

For remote object 120 source protocols that result in a file being stored on at least one storage medium, source information may be stored in an alternate file stream or as attributes attached to or associated with the file. For other remote source protocols, a custom source tagging process may be necessary to associate the remote object 120 with the referrer context information. A source tag is the way this information is tied to the link, and includes the referrer context information to be associated with the remote object link.

The remote object link identification module 310 also identifies links in outbound network traffic. In this context, the referrer context information may include information associated with the recipient of the remote link. Thus, referrer context information may include a direction associated with the network traffic (e.g., inbound or outbound), a protocol, the remote link itself, the referrer (sender) and recipient (receiver), time of transmission, time of receipt, and the like.

Once a remote link and associated referrer context information are identified, the remote object link identification module 310 sends the link and the referrer context information to a link storage module 315.

A link storage module 315 stores remote links and associated referrer context information received from the remote object link identification module 310. The link storage module 315 is a relational database according to one embodiment. Alternatively, the link storage module 315 may be an Extensible Markup Language (XML) file, text file, or any other data storage module. In some embodiments, the link storage module 315 is integrated with the other portions of the global referrer system 130 on the same device. Alternatively, the link storage module 315 may be implemented on a separate device from the monitoring functionality of the network inspection module 110, as indicated by the dashed line surrounding the link storage module.

A look up module 320 provides access to the remote links and referrer context information stored in the link storage module 315. Specifically, in response to a request for the source of a remote link, the look up module 320 accesses the link storage module 315 and returns the remote link referrer context information. The request for the referrer context information may include source tag information as described herein. Alternatively, the source information for the remote object 120 may be stored locally, for example in an alternate source stream in the case of downloading a file from a website using a Windows operating system. The request results from an attack on the client 105, or detection of malicious code associated with a remote object 120. Alternatively, the request may result from detection of an outbound request for the remote object 120, e.g., by the client 105, using the associated remote link. The referrer context information retrieved can then be used for threat detection or other means requiring source data. In one embodiment, the request results from a call into the global referrer system 130 by the access statistics collection module 135.

The above modules 310-320 need not be discrete modules. The configuration shown in FIG. 3 is meant only by way of example and not limitation; other configurations are within the scope of the present invention.

Figure 5:
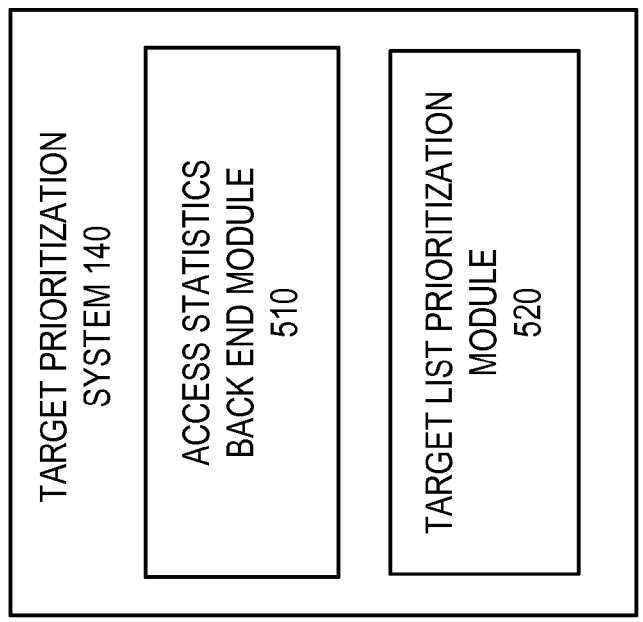
FIG. 5 is a block diagram illustrating a detailed view of a target prioritization system according to one embodiment.

FIG. 5 is a block diagram illustrating a detailed view of a target prioritization system 140 according to one embodiment. In some embodiments the target prioritization system 140 is incorporated into an operating system executing on the client 105 while in other embodiments the target prioritization system 140 may be a standalone application or part of another product. As shown in FIG. 5, the target prioritization system 140 itself includes multiple modules. Those of skill in the art will recognize that other embodiments of the target prioritization system 140 can have different and/or other modules than the ones described here, and that the functionalities can be distributed among the modules in a different manner.

The target prioritization system 140 includes an access statistics back end module 510 and a target link prioritization modules 520 according to one embodiment.

The access statistics back end module 510 is a relational database according to one embodiment. Alternatively, the access statistics back end module 510 may be an XML file, text file, or any other data storage module. In some embodiments, the access statistics back end module 510 is integrated with the other portions of the target prioritization system 140 on the same device.

The access statistics back end module 510 receives referrer context information from the access statistics collection module 135 and stores it. The access statistics back end module 510 also aggregates the referrer context information for various links and associated with various client 105 network accesses.

The target list prioritization module 520 analyzes this data for one or more clients 105, and uses the results of the analysis to prioritize the target queue of the web crawler 150. The target list prioritization module 520 also may store the prioritization. The target list prioritization module 520 analysis is based on the referrer context information for the link with respect to one or more clients 105, i.e., how the link spread, and the number of clients 105 that visited the link. A link to a remote object may be prioritized higher within the web crawler link queue relative to other links in the queue, e.g., based on having a higher number of client visits to the link, access to the link by a high proportion of client devices being via a single protocol, or having a high number of client visits to the link occurring during a short period of time via multiple protocol.

The method by which the target list prioritization module 520 prioritizes target links in the web crawler's target link queue is specific to the goals of the particular web crawler 150. A web crawler 150 associated with a threat detection search engine would place a higher priority on a link that spread very quickly to many clients 105 via a single protocol. For example, if the referrer context information associated with a link indicates that it was received by clients 105 via IM, and attribute information associated with the referrer context information indicates that it was subsequently transmitted to most or the entire list of buddies on the IM buddy list of the client 105 at which the link was received, the link is likely associated with a virus or worm, and thus should be investigated immediately. A web crawler 150 associated with a web search engine would place a higher priority on a link that spread very quickly via a variety of different protocols. For example, if a link, e.g., to a video, was received at a client via email, and was sent to several people on the client's IM buddy list, and also was received at other clients via email or IM, this "link buzz" indicates the popularity of the link. A standard search engine 145 would prioritize this link higher because it would want to have indexed the link to provide clients 105 more relevant search results.

In addition, the target list prioritization module 520 can be cross-referenced with suspicious content, file names, and/or binary signatures identified by other means, e.g., antimalware software products, to further tune the prioritization of the web crawler link queue.

The above modules 510, 520 need not be discrete modules. The configuration shown in FIG. 5 is meant only by way of example and not limitation; other configurations are within the scope of the present invention.

Figure 4:
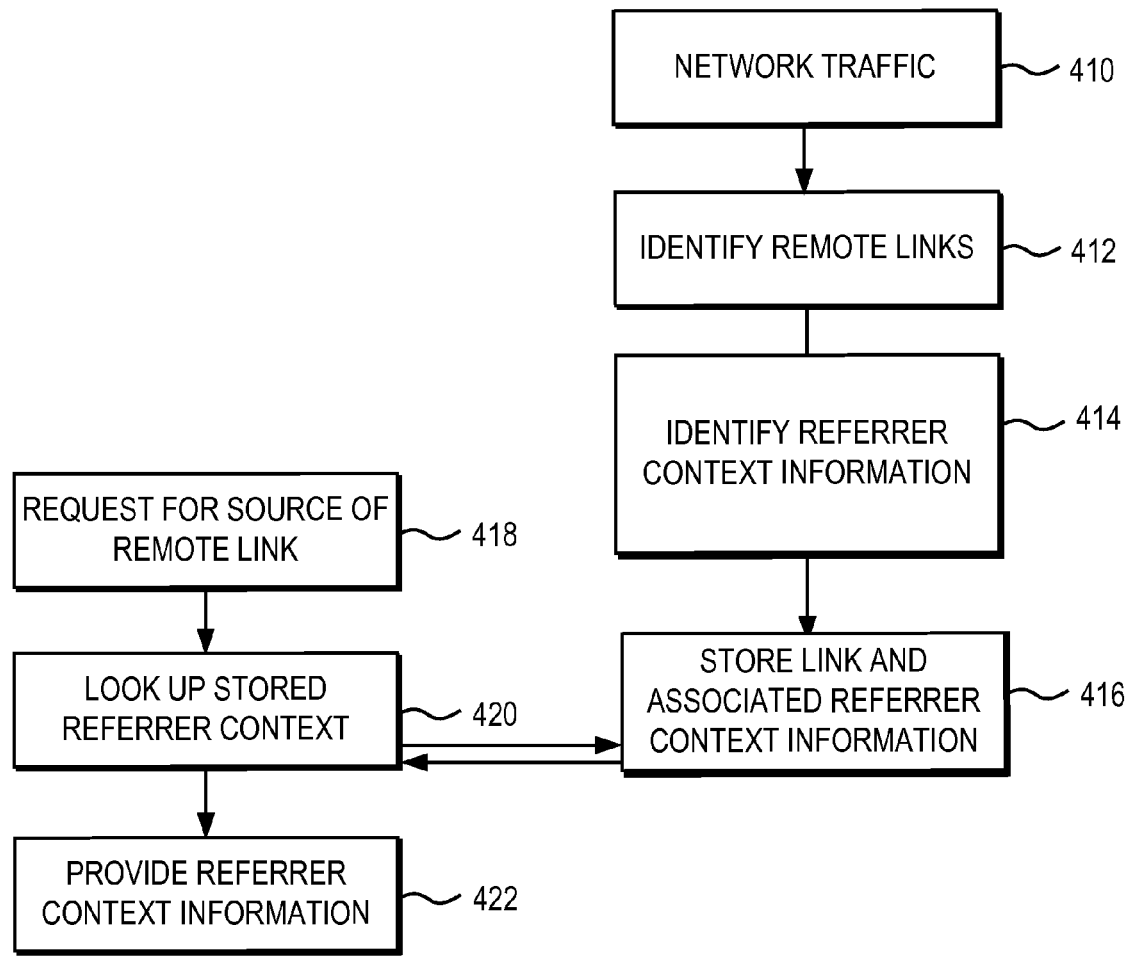
FIG. 4 is a flowchart illustrating steps performed by a global referrer system according to one embodiment.

FIG. 4 is a flowchart illustrating steps performed by a global referrer system 130 according to one embodiment. Other embodiments perform the illustrated steps in different orders, and/or perform different or additional steps. Moreover, some or all of the steps can be performed by modules other than those referenced.

A network inspection module 110 monitors 410 network traffic as it arrives at, or is transmitted from, a client 105, either as a remote or local network proxy or network appliance. Remote links in network traffic 410, e.g., links to remote objects 120, are identified 412 by a remote object link identification module 310. The remote links may be URLs, UNCs, or any string or binary data that represents a location of a remote object 120. The remote object link identification module 310 uses pattern matching to identify 412 the remote links in the network traffic 410. For example, a user of client device 105 receives an IM text message from a friend, Bob, with a link to a remote object 120. The remote object link identification module 310 identifies 412 the remote link in the message.

Referrer context information also is identified 414 for the remote link by the remote object link identification module 310. The referrer context information is specific to the protocol on which the remote link was found and the remote object link identification module 310 can identify 414 referrer context information from any of a number of protocols. For some remote source protocols, the identifying 414 further includes a custom source tagging process for associating the remote object 120 with the referrer context information. In some embodiments, the time of transmission and the time of receipt of the remote link also are identified. The referrer context information is stored 416, along with the link, at a link storage module 315. Continuing with the above example, the remote object link identification module 310 identifies 414 the referrer context from the message received from Bob. In this case, the referrer context information includes Bob's user name, "IMTxtR," and the server Bob used, "CoServ1."

Some time later, a request 418 for the source of a remote link is received, from the client 105 or from a third party, e.g., via the network 115. The request for the referrer context information may include source tag information. The request may result from, e.g., an attack on the client 105, or detection of malicious code associated with a remote object 120. Alternatively, the request may result from detection of an outbound request for the remote object 120, e.g., by the client 105, for accessing the associated remote link. In addition, the request may result from a call into the global referrer system 130 by the access statistics collection module 135.

In response to the request 418, the look up module 320 looks up 420 the stored referrer context information associated with the link and stored in the link storage module 315. The referrer context information is provided 422 to the requestor. The retrieved referrer context information can then be used for threat detection or other means requiring source data.

Figure 6:
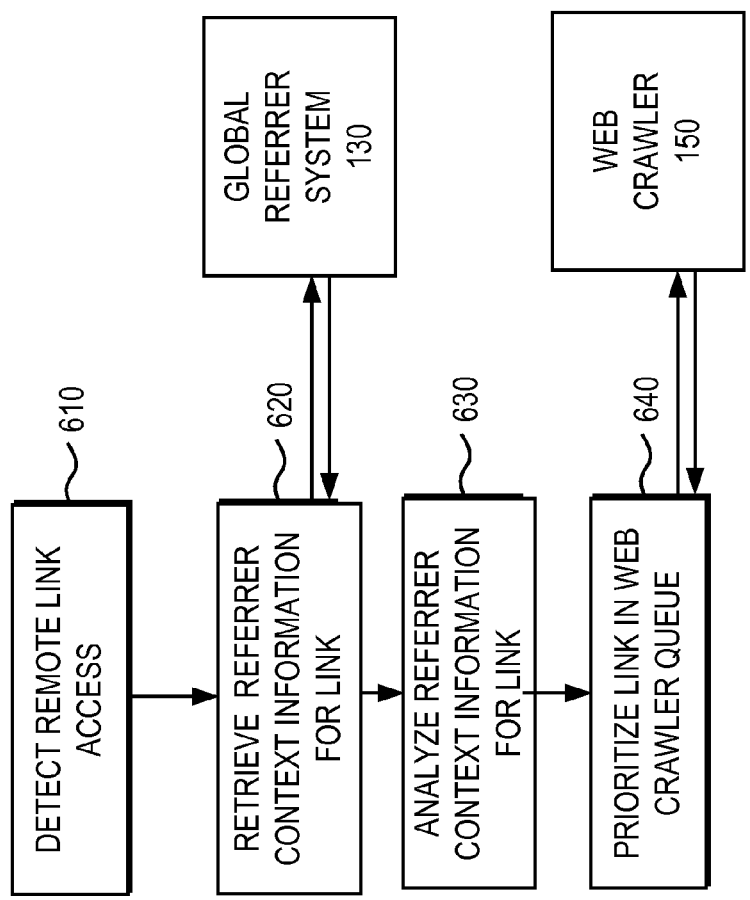
FIG. 6 is a flowchart illustrating steps performed by a target prioritization system according to one embodiment.

FIG. 6 is a flowchart illustrating steps performed by a target prioritization system according to one embodiment. Other embodiments perform the illustrated steps in different orders, and/or perform different or additional steps. Moreover, some or all of the steps can be performed by modules other than those referenced.

Initially, the access statistics collection module 135 detects 610 accesses to a remote link. Upon detection, the access statistics collection module 135 puts a call into the global referrer system 130 to retrieve 620 referrer context information associated with the detected link. The access statistics collection module 135 then passes off the referrer context information and detected remote link to the access statistics back end module 510 of the target prioritization system 140.

The access statistics back end module 510 stores the referrer context information and aggregates it for multiple clients 105. The target list prioritization module 520 analyzes 630 the stored referrer context information in conjunction with the number of clients 105 that visited the link. The target list prioritization module 520 uses the results of the analysis to prioritize 640 a target queue of a web crawler 150. The method by which the target list prioritization module 520 prioritizes used for target links in the web crawler's target link queue is specific to the goals of the particular web crawler 150. For example, a link to a remote object may be prioritized higher within the web crawler link queue relative to other links in the queue, e.g., based on having a higher number of client visits to the link (a possible indication that the link is popular or self-spreading), access to the link by a high proportion of client devices being via a single protocol (a possible indication of a self-spreading or otherwise malicious link), or having a high number of client visits to the link occurring during a short period of time via multiple protocol (a possible indication of "link buzz" indicating very high popularity for the link). In addition, the target list prioritization module 520 can be cross-referenced with suspicious content, file names, and/or binary signatures identified by other means, e.g., antimalware software products, to further tune the prioritization 640 of the web crawler link queue.

The description in the specification is included to illustrate the operation of certain embodiments, is not all inclusive, and is not meant to limit the scope of the invention. The scope of the invention is to be limited only by the following claims. In particular, many additional features and variations will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The invention claimed is:

1. A method of prioritizing a web crawler target link queue, comprising:
retrieving referrer context information associated with a link to a remote object with respect to a plurality of client devices, the referrer context information identifying how the link was spread among the plurality of client devices, wherein the link is spread among the plurality of client devices via a plurality of different networking protocols and the retrieved referrer context information is different for the different networking protocols via which the link was spread;
aggregating the retrieved referrer context information;
analyzing the aggregated retrieved referrer context information for the link to the remote object to determine whether the aggregated retrieved referrer context information identifying how the link was spread among the plurality of client devices indicates a threat to the plurality of client devices; and
prioritizing the link to the remote object within the web crawler target link queue relative to other links in the web crawler target link queue based on the analyzed aggregated retrieved referrer context information, wherein a priority of the link is increased responsive to the determination that the aggregated retrieved referrer context information indicates the threat to the plurality of client devices.

2. The method of claim 1, further comprising detecting access to the remote object by one or more of the plurality of client devices via the link to the remote object.

3. The method of claim 1, wherein the analyzing includes examining a relationship between the aggregated retrieved referrer context information and a number of clients that visited the link to the remote object.

4. The method of claim 1, further comprising storing the priority based on the analyzed aggregated retrieved referrer context information.

5. The method of claim 1, wherein the retrieving further comprises:
transmitting a request for a source of the link to the remote object to a global referrer system associated with a client device of the plurality of client devices; and
receiving from the global referrer system associated with the client device the referrer context information associated with the link to the remote object, the referrer context information comprising the source of the link to the remote object.

6. The method of claim 1, further comprising:
in response to detecting access to the remote object by a client device of the plurality of client devices:
retrieving the referrer context information associated with the link to the remote object with respect to the client device.

7. The method of claim 1, wherein the analyzing comprises examining the aggregated retrieved referrer context information to identify the different networking protocols via which the link to the remote object was spread among the plurality of client devices, wherein the aggregated retrieved referrer context information indicates the threat to the plurality of client devices responsive to a high proportion of the plurality of client devices receiving the link to the remote object via a same network protocol.

8. The method of claim 1, wherein the analyzing comprises examining the aggregated retrieved referrer context information to identify the different networking protocols via which the link to the remote object was spread among the plurality of client devices and a number of client visits to the link to the remote object that occurred during a short period of time, and wherein the prioritizing comprises increasing the priority of the link responsive to the determination indicating that the link to the remote object was spread among the plurality of client devices via the plurality of different networking protocols and that the number of client visits to the link to the remote object occurred during the short period of time.

9. The method of claim 1, wherein the referrer context information includes transmission context information indicating a context in which the link was transmitted and associated attribute information.

10. The method of claim 1, wherein the referrer context information identifying how the link was spread among the plurality of client devices comprises information identifying how the link was sent to one or more of the plurality of client devices and information identifying how the link was sent from the one or more of the plurality of client devices.

11. A non-transitory computer-readable storage medium having computer program instructions embodied therein for prioritizing a web crawler target link queue, comprising:
an access statistics collection module configured to:
retrieve referrer context information associated with a link to a remote object with respect to a plurality of client devices, the referrer context information identifying how the link was spread among the plurality of client devices, wherein the link is spread among the plurality of client devices via a plurality of different networking protocols and the retrieved referrer context information is different for the different networking protocols via which the link was spread; and
a target list prioritization module configured to:
aggregate the retrieved referrer context information;
analyze the aggregated retrieved referrer context information for the link to the remote object to determine whether the aggregated retrieved referrer context information identifying how the link was spread among the plurality of client devices indicates a threat to the plurality of client devices; and
prioritize the link to the remote object within the web crawler target link queue relative to other links in the web crawler target link queue based on the analyzed aggregated retrieved referrer context information, wherein a priority of the link is increased responsive to the determination that the aggregated retrieved referrer context information indicates the threat to the plurality of client devices.

12. The non-transitory computer-readable storage medium of claim 11, wherein the access statistics collection module is further configured to detect access to the remote object by one or more of the plurality of client devices via the link to the remote object.

13. The non-transitory computer-readable storage medium of claim 11, wherein the target list prioritization module is further configured to examine a relationship between the aggregated retrieved referrer context information and a number of client devices that visited the link to the remote object.

14. The non-transitory computer-readable storage medium of claim 11, wherein the access statistics collection module is further configured:
to transmit a request for a source of the link to the remote object to a global referrer system associated with a client device of the plurality of client devices; and
to receive from the global referrer system associated with the client device the referrer context information associated with the link to the remote object, the referrer context information comprising the source of the link to the remote object.

15. The non-transitory computer-readable storage medium of claim 11, wherein:
the access statistics collection module is further configured to:
detect access to the remote object by a client device of the plurality of client devices; and
retrieve the referrer context information associated with the link to the remote object with respect to the client device.

16. The non-transitory computer-readable storage medium of claim 11, wherein the analyzing comprises examining the retrieved aggregated referrer context information to identify the different networking protocols via which the link to the remote object was spread among the plurality of client devices, wherein the aggregated retrieved referrer context information indicates the threat to the plurality of client devices responsive to a high proportion of the plurality of client devices receiving the link to the remote object via a same network protocol.

17. A computer configured to prioritize a web crawler target link queue, comprising:
a non-transitory computer-readable storage medium having computer program instructions embodied therein comprising:
an access statistics collection module configured to:
retrieve referrer context information associated with a link to a remote object with respect to a plurality of client devices, the referrer context information identifying how the link was spread among the plurality of client devices, wherein the link is spread among the plurality of client devices via a plurality of different networking protocols and the retrieved referrer context information is different for the different networking protocols via which the link was spread; and a target list prioritization module configured to:

aggregate the retrieved referrer context information;

analyze the aggregated retrieved referrer context information for the link to the remote object to determine whether the aggregated retrieved referrer context information identifying how the link was spread among the plurality of client devices indicates a threat to the plurality of client devices; and prioritize the link to the remote object within the web crawler target link queue relative to other links in the web crawler target link queue based on the analyzed aggregated retrieved referrer context information, wherein a priority of the link is increased responsive to the determination that the aggregated retrieved referrer context information indicates the threat to the plurality of client devices; and a processor for executing the computer program instructions.

* * * * *